April 17, 1956 L. M. POTTER ET AL 2,742,138
FEED TROUGH AND DISTRIBUTING SYSTEM
Filed Aug. 13, 1952 4 Sheets-Sheet 1
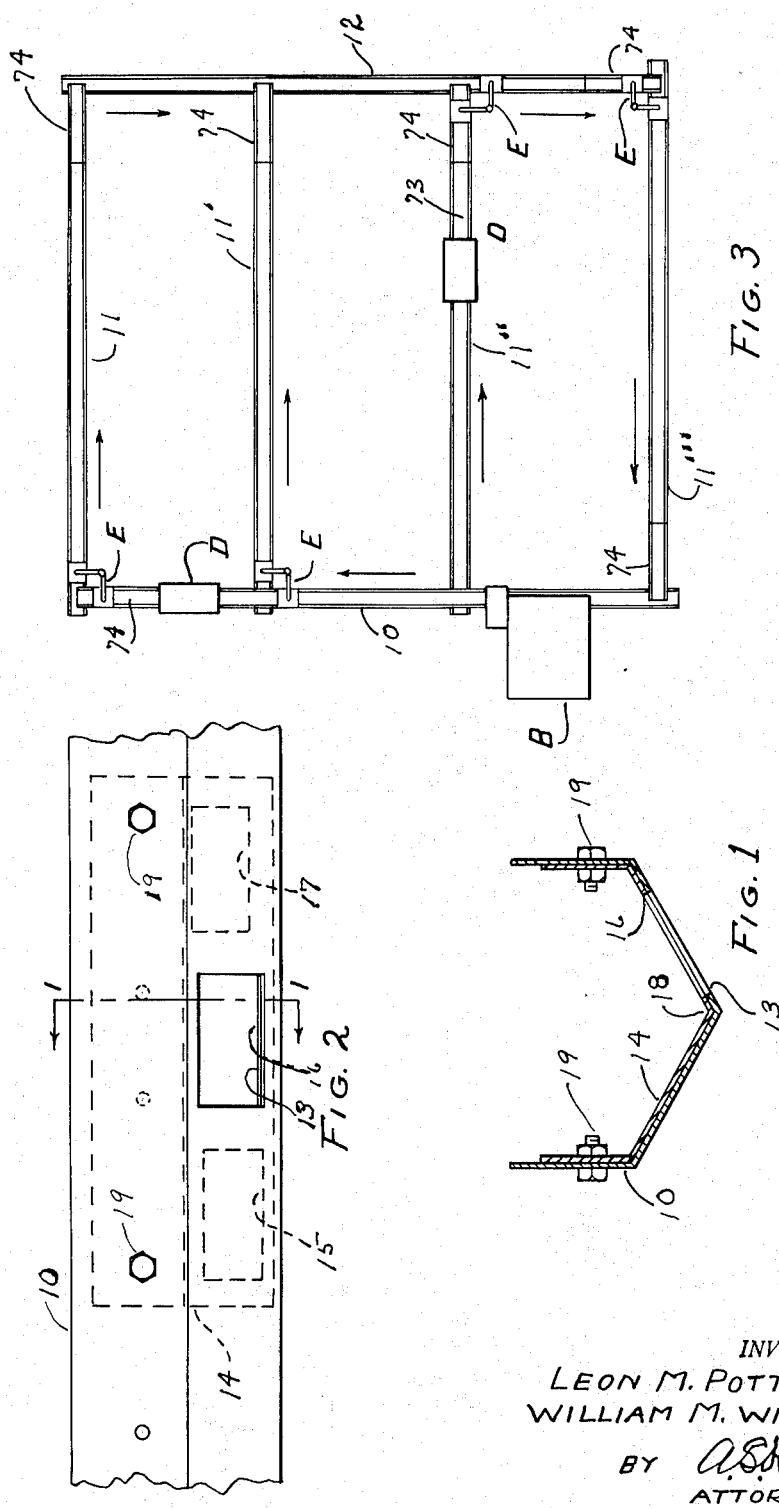
INVENTORS
LEON M. POTTER
WILLIAM M. WILLETT
BY
ATTORNEY April 17, 1956 — L. M. POTTER ET AL — 2,742,138

FEED TROUGH AND DISTRIBUTING SYSTEM

Filed Aug. 13, 1952 — 4 Sheets-Sheet 2

INVENTORS
LEON M. POTTER
WILLIAM M. WILLETT
BY A.S.Kroh
ATTORNEY

April 17, 1956 L. M. POTTER ET AL 2,742,138
FEED TROUGH AND DISTRIBUTING SYSTEM
Filed Aug. 13, 1952 4 Sheets-Sheet 3
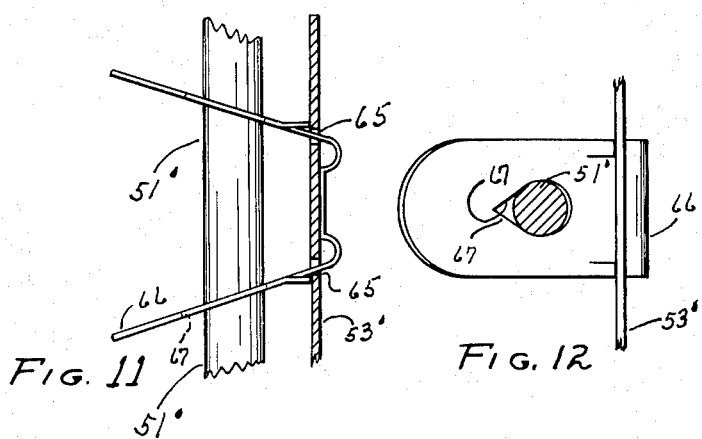
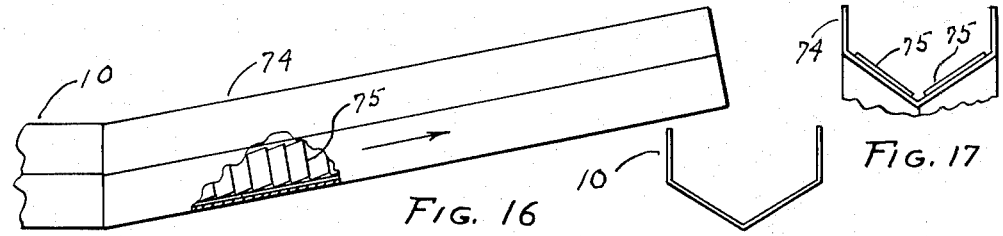
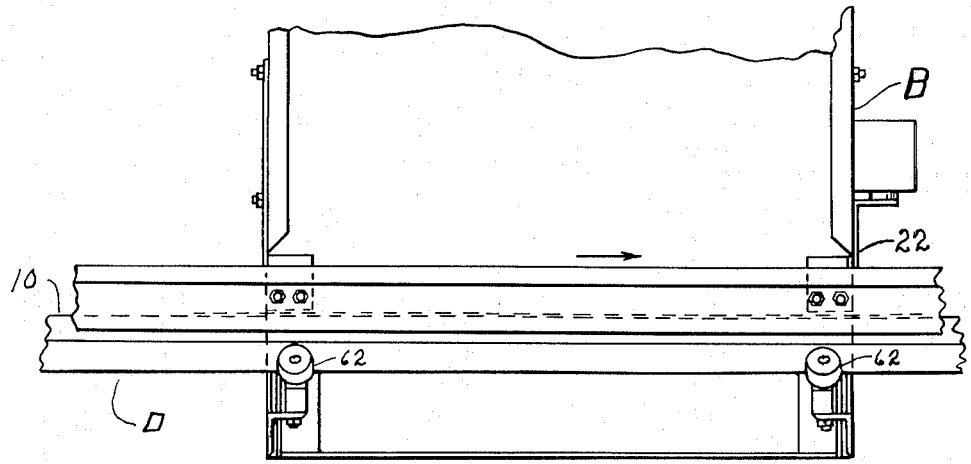
INVENTORS
LEON M. POTTER
WILLIAM M. WILLETT
BY
ATTORNEY April 17, 1956   L. M. POTTER ET AL   2,742,138
FEED TROUGH AND DISTRIBUTING SYSTEM
Filed Aug. 13, 1952   4 Sheets-Sheet 4
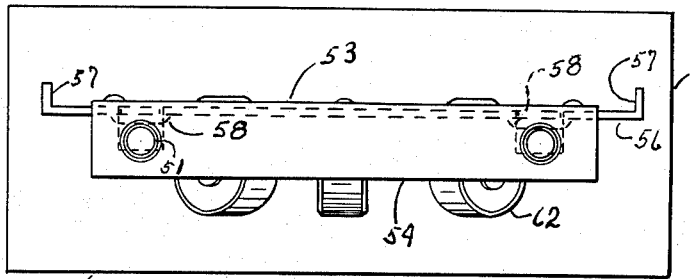
Fig. 7
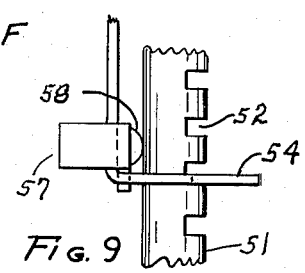
Fig. 9
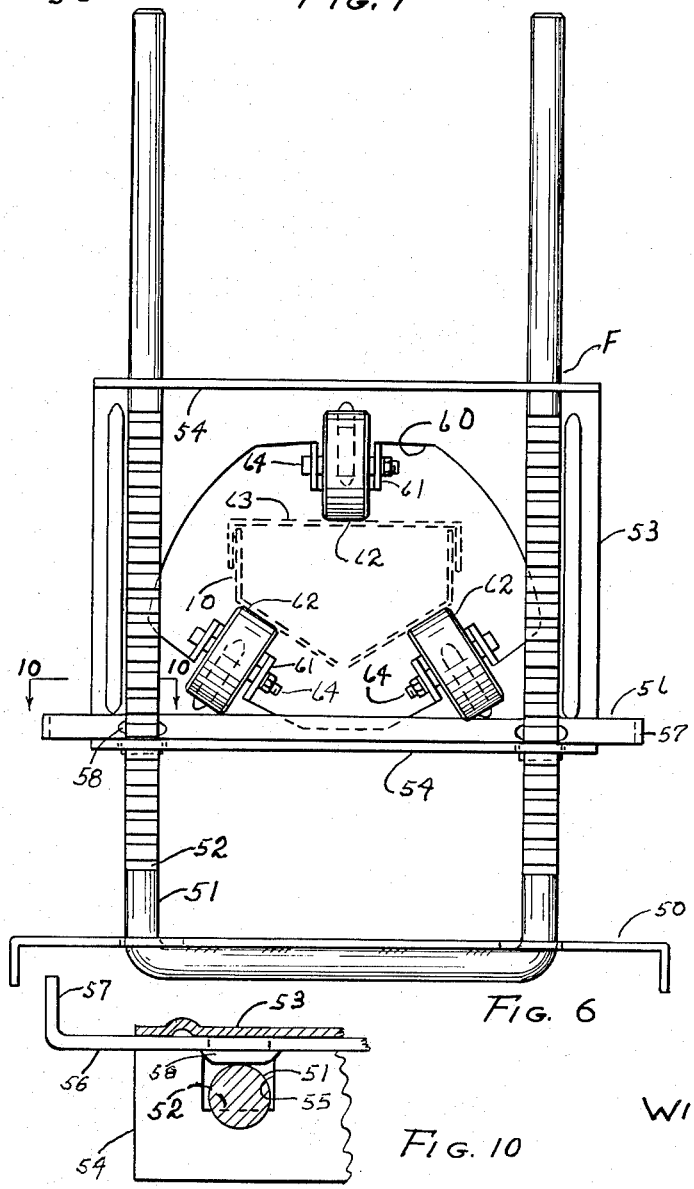
Fig. 6
Fig. 10
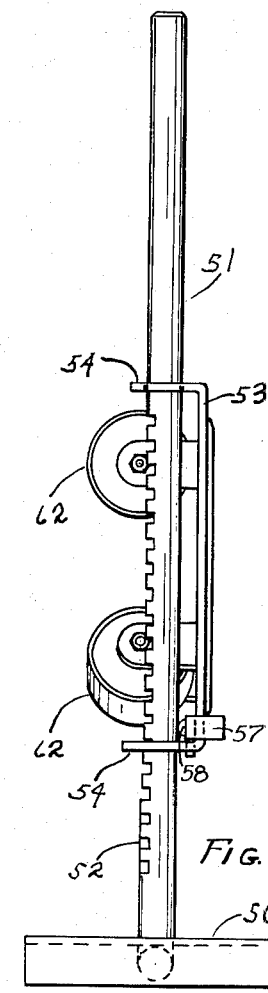
Fig. 8
INVENTORS
LEON M. POTTER
WILLIAM M. WILLETT
BY *W. S. Knob*
ATTORNEY

United States Patent Office 2,742,138
Patented Apr. 17, 1956

2,742,138

FEED TROUGH AND DISTRIBUTING SYSTEM

Leon M. Potter and William M. Willett, Fort Atkinson, Wis., assignors to James Mfg. Co., Fort Atkinson, Wis., a company of Wisconsin Application August 13, 1952, Serial No. 304,118

2 Claims. (Cl. 198—78)

The present invention relates to an oscillating continuous feed trough system, the troughs being arranged in series or in series multiple, having a single supply hopper with means for maintaining the height of the feed in the main feed trough at the feed-in place.

Our improved troughs are provided with primary oscillating mechanisms and secondary oscillating mechanisms adapted to cause the material to move forward from the point where it is fed into a trough and having means for returning the surplus feed to the main trough in rear of the supply hopper.

A novel feature of our invention is supplying a number of supplemental troughs preferably arranged at right angle to the main trough and arranged in spaced relation, the main or first trough having means for metering the desired amount of feed into the inlet end of one or more of the supplemental troughs, so certain supplemental troughs are kept supplied with the desired quantity of feed. There is supplied preferably a receiving trough at the delivery end of the supplemental troughs and one of the supplemental troughs being arranged to return the surplus feed from the receiving trough to the main trough and ahead of the feed-in place.

Our invention contemplates preferably an arrangement of main, supplemental and receiving troughs, for feeding a maximum number of birds in enclosures of various shapes.

A novel feature of our invention is the adjustable means we evolved for metering the feed from the main trough into one or more supplemental troughs. Another novel feature of our invention is our means for oscillatingly supporting the troughs and for adjusting the troughs to various vertical positions for serving birds of different ages and sizes and without disturbing the primary oscillating mechanism.

It will be seen from the foregoing preamble that with a sufficiently large supply container or hopper our novel feeding device will require minimum attention of an operator and serve a maximum number of birds in a minimum sized enclosure.

To these and other useful ends our invention consists of parts, combinations of parts or their equivalents and mode of operation as hereinafter described and claimed and shown in the accompanying drawings in which:

Fig. 1 is a transverse sectional view of our preferred form of a trough taken on line 1—1 of Figure 2.

Fig. 2 is a side elevational view of a short section of the trough and showing by dotted lines the adjustable gate valve shown in section in Figure 1 and as used in the main feed trough.

Fig. 3 is a diagrammatic top view of our feeding trough arrangement suitable for an enclosure of about the same width as length wherein several oscillating troughs are required and wherein the supply hopper is shown as positioned at the receiving end of the main trough.

Fig. 5 is a fractional front view of the hopper as shown in Figure 4.

Figs. 6–10 illustrate our novel trough carrying and height adjusting means.

Figs. 11 and 12 illustrate a modification of the means for supporting the trough carrying bracket.

Fig. 16 illustrates a side view of the means for delivering the feed from the end of a feed trough into the adjacent trough which is usually at right angles to the other trough as shown in this figure, a portion being cut away to illustrate a fraction of the means supplied for urging the forward movement of the material.

Fig. 17 is an end view of the raised portion of the trough shown in Figure 16.

Figures 13, 14:
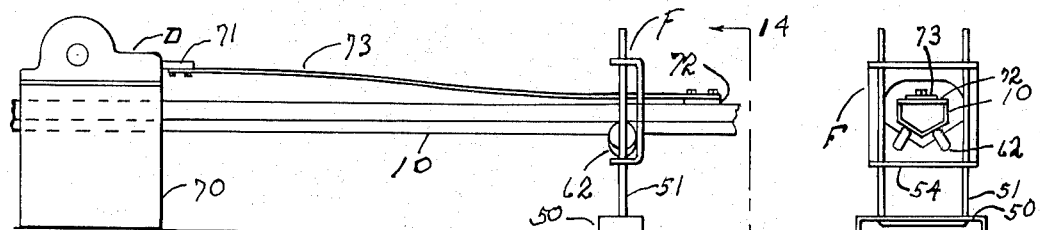
Fig. 13 is a side elevational view of a trough having an operating connection to the oscillating mechanism.
Fig. 14 is an end view of the trough shown in Figure 13 and viewed from line 14.

It will be understood that generally one oscillating means is adapted to operate the main trough from which the motion may be transferred mechanically to supplemental troughs as shown in Figure 3. The position and number of oscillating means are generally determined by the number and length of the troughs.

The means for connecting the oscillating mechanism to the troughs is optional. In the present instance the primary oscillating mechanism is positioned above certain troughs and supplemental oscillators are provided for other troughs as shown in Figure 3.

In Figure 3 the main trough is designated by numeral 10 and is operatively connected to an oscillating member D. Two of the supplemental troughs are designated by numerals 11 and 11' and receive their oscillating motion from trough 10 by means of bell-cranks E. The receiving trough is designated by numeral 12 and the two other supplemental troughs by numerals 11'' and 11'''. In this particular assembly an oscillating mechanism D is operatively connected to trough 11'' and its motion is conveyed to troughs 12 and 11''' by means of bell-cranks E. Thus it will be seen that all of the troughs will be oscillated and the feed caused to move in the direction indicated by arrows.

All of the troughs are preferably similar in shape to trough 10. In Figure 3 it will be noted that troughs 11' and 11'' have their inlet ends positioned under an outlet 13 in the bottom of trough 10. Outlet 13 has means for regulating the flow of material into troughs 11' and 11'' comprising a plate 14 which fits into the bottom of trough 10 as illustrated in Figure 1 and having 3 outlets or openings 15, 16 and 17, each positioned a different distance from the apex 18 of plate 14. Member 14 is adjustably secured in trough 10 by means of bolts 19—19 so that either one of the outlets 15, 16 or 17 may be held over outlet 13 for regulating the flow of the material into troughs 11' or 11'', the relative flow being brought about by the distance the lower edges of members 15, 16 or 17 are from basal apex 18. Further adjustments are possible by the use of slots (not shown) in member 14.

Figure 15:
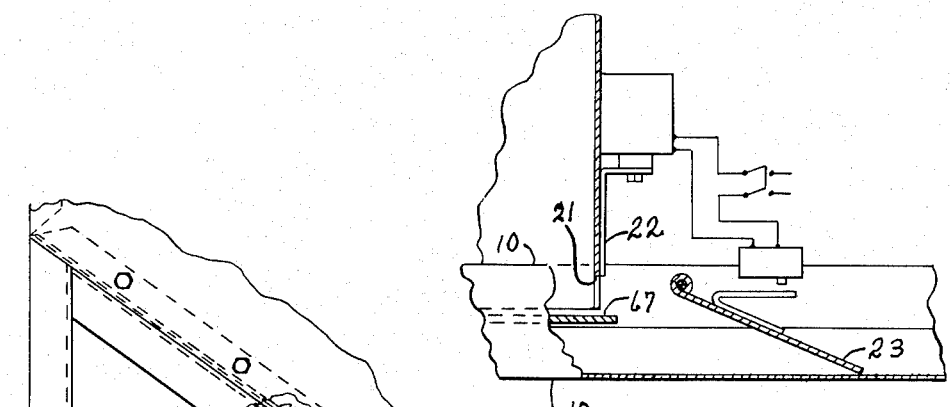
Fig. 15 is a detail view illustrating a fraction of the feed hopper, a gate valve and a flapper plate operatively connected thereto for regulating the feed from the hopper to the trough.
Figure 4:
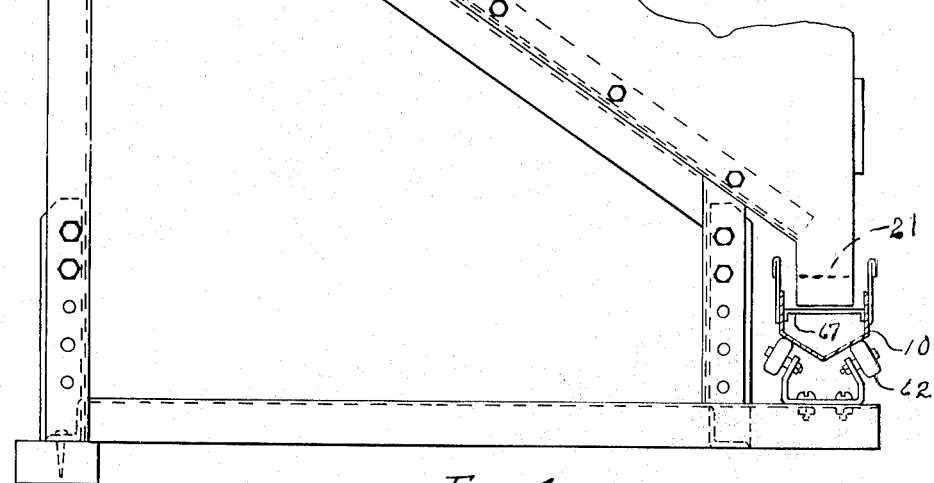
Fig. 4 is an end fractional view of a preferred design of a supply hopper.

Figure 3 illustrates an arrangement of main trough 10 with four supplemental troughs and a receiving trough 12. Figure 3 also illustrates the top view of the feed hopper B. The bottom of this hopper depends downwardly as at 20 (see Figure 4), so the feed will flow by gravity to the outlet 21 (see Figure 15) at which point there is positioned a gate valve 22 which is controlled by a flapper plate 23 having a mechanical or electric connection to valve 22 so when the feed in trough 10 is below a predetermined height, the valve will be opened and the valve will be closed when the feed raises to a predetermined height.

We will now describe our adjustable support for the troughs as illustrated in Figures 6–12.

After the chicks are taken from the brooder they begin to grow rapidly. It is a great advantage to then put them in an enclosure equipped with our invention so they can be left there throughout their growing and laying seasons. Our feed trough supporting means in its entirety is designated by reference character F and comprises a base plate 50, having secured thereto a U-shaped member 51, having a multiplicity of transverse grooves 52 cut in their front faces. A bracket 53 has flanges 54—54 formed thereon with spaced openings 55—55 through which members 51 pass freely when moved to the rear side of these openings.

It will be noted that the fronts of openings 55 are adapted to fit into grooves 52 when brackets 53 are moved rearwardly, thus to lock this bracket into a selected position and it is held in this position by means of a bar 56, having short flanges 57 on each end. Member 56 is provided with projections 58—58 having a suitable height and length and positioned so, for example, member 56 may be positioned and locked into position by moving member 56 in the position shown in Figures 6 and 7, thus as clearly indicated in the figures, member 53 will be held in position by grooves 52.

For adjusting the height of member 53, all that is necessary is to move member 56 endwise far enough so members 51 may be moved out of slots 52. When 53 is moved to the desired position, member 56 may be then moved to the position shown in Figure 10 for again locking bracket 53 into position. When bracket 53 is in its lowest position the various troughs will be near enough to the floor of the enclosure for the birds when removed from the hover, after which brackets 53 may be raised as the birds grow until they reach the laying age.

The troughs are supported in brackets 53 as follows: an opening 60 is cut into member 53 in a manner so ears 61 may be integrally formed and spaced apart far enough for the free reception of rubber tired pulleys 62. The V-shaped bottom of the troughs 10 rest on the two bottom pulleys and the top pulley is positioned adjacent plate 63, so as to prevent the trough from raising out of position. Pulleys 62 may be of the standard castor wheel type and are rotatably mounted on ears 61 by means of bolts 64. Thus it will be seen that the troughs will be adequately positioned and oscillatingly and noiselessly supported on brackets 53.

In Figures 11 and 12 we illustrate a modification of the holding means shown in the other figures wherein grooves 52 may be dispensed with. In this design member 53' is provided with vertically spaced slots 65—65. We provide a spring type bracket 66 made from thin flat stock and shaped as shown, the legs of which are provided with openings 67 and positioned so the free ends of members 66 may be forced together and moved into slot 65 and held in this position for the free reception of members 51'. Thus when the free ends of members 66 are released, member 53' will be locked into vertical position.

It will be seen that to adjust member 53' all that is necessary is to move the free ends of member 66 together far enough to free member 53', and when 53' is in the desired position by releasing these free ends, 53' will be locked into position. Obviously a suitable roof or cover (not shown) could be provided for the feed trough. This cover may be supported in any suitable manner, preferably on members 54.

In Figures 13 and 14 we illustrate the oscillating mechanism D as being supported on transversely spaced legs 70 which hold member D high enough from the floor enclosure, so the troughs which are freely positioned between members 70 may be raised or adjusted to their various vertical positions. Member D has an oscillating projection 71, and a short plate 72 is secured to the top of the trough and located far enough from member D so a thin flat member 73 forms an operating connection between members 71 and 72, member 73 having spring characteristics so it operates successfully with the trough in any desired position, obviously member 73 may be rigid with hinged connections at one or both ends, thus providing means for raising and lowering the troughs.

Since the troughs are preferably adjusted to the same distance from the floor, provisions must be made at the ends of the troughs for delivering the feed in the inlet end of the adjacent trough. This means is shown in Figures 16 and 17 wherein a short ascending length 74 of the troughs is shown. In order to assist in moving the feed forward members 74 are provided at their bottoms with ratchet shaped, closely spaced, transversely arranged projections 75, the free ends being about the height of the thickness of the material. Thus these projections 75 will act to urge the feed forward at about the desired speed and deliver the feed into the inlet end of the adjacent trough by gravity.

It will be seen that we have evolved a very simple and effective means for feeding poultry, either for growing or laying seasons, in any size building wherein a maximum number of birds can be served in a most efficient manner and at minimum cost for the equipment and attention.

Clearly many minor detail changes may be made in the designs shown without departing from the spirit and scope of our invention as recited in the appended claims.

We claim:

1. A poultry feeder comprising a first trough and a second trough transverse to said first trough and having a portion thereof disposed beneath a portion of the first trough intermediate its ends, means for reciprocating said troughs, said first trough being provided with an opening above said portion of said second trough to discharge feed by gravity from said first trough to said second trough through said opening, and means for selectively covering part of said opening to regulate the quantity of feed discharged through said opening, said first trough comprising a bottom inclined to the horizontal, said aperture being disposed in said bottom and extending to substantially the lowermost level thereof, said means comprising a plate and means for adjusting the plate, said plate having apertures selectively registrable with the trough bottom aperture, said plate apertures being differentially spaced from said lowermost level.

2. The device of claim 1 in which said inclined bottom is V-shaped in cross section, said aperture being disposed wholly at one side of the basal apex of said bottom.

References Cited in the file of this patent

UNITED STATES PATENTS

| | | |
|---|---|---|
| 1,647,704 | Lee | Nov. 1, 1927 |
| 2,043,595 | Raymond | June 9, 1936 |
| 2,246,497 | Beck | June 24, 1941 |
| 2,446,965 | Sweeten | Aug. 10, 1948 |
| 2,458,077 | Jacobsen | Jan. 4, 1949 |
| 2,522,449 | Inman | Sept. 12, 1950 |
| 2,588,030 | Musschoot et al. | Mar. 4, 1952 |
| 2,591,609 | Roberts et al. | Apr. 1, 1952 |
| 2,618,376 | May, Jr. | Nov. 18, 1952 |
| 2,635,737 | Garnett | Apr. 21, 1953 |
| 2,683,439 | Markey | July 13, 1954 |